(12) United States Patent
Ranganathan et al.

(10) Patent No.: US 10,158,746 B2
(45) Date of Patent: Dec. 18, 2018

(54) WIRELESS COMMUNICATION SYSTEMS AND METHODS WITH VEHICLE DISPLAY AND HEADGEAR DEVICE PAIRING

(71) Applicant: Visteon Global Technologies, Inc., Van Buren Township, MI (US)

(72) Inventors: Sreeniwas Ranganathan, Glendale, WI (US); Sumeet Agarwal, Gurgaon (IN); Sundar Neelamegam, Holland, MI (US); Amit Patankar, Pune (IN)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days.

(21) Appl. No.: 15/321,039

(22) PCT Filed: Jun. 26, 2014

(86) PCT No.: PCT/US2014/044425
§ 371 (c)(1),
(2) Date: Dec. 21, 2016

(87) PCT Pub. No.: WO2015/199704
PCT Pub. Date: Dec. 30, 2015

(65) Prior Publication Data
US 2017/0155749 A1 Jun. 1, 2017

(51) Int. Cl.
*H04M 1/00* (2006.01)
*H04M 1/60* (2006.01)
(Continued)

(52) U.S. Cl.
CPC .......... *H04M 1/6075* (2013.01); *H04B 1/385* (2013.01); *H04M 1/6066* (2013.01);
(Continued)

(58) Field of Classification Search
CPC .... H04M 1/6075; H04M 1/7253; H04B 1/385
(Continued)

(56) References Cited

U.S. PATENT DOCUMENTS

| 8,010,171 B2 * | 8/2011 | Fettig | H04B 5/06 340/928 |
| 2003/0036360 A1 * | 2/2003 | Russell | A42B 3/30 455/66.1 |

(Continued)

FOREIGN PATENT DOCUMENTS

EP    1 188 617 A2    3/2002

OTHER PUBLICATIONS

International Preliminary Report on Patentability and Transmittal received in International Application No. PCT/US2014/044425 dated Jan. 5, 2017, 9 pages.
International Search Report in corresponding International Application No. PCT/US2014/044425 dated Mar. 3, 2015, 4 pages.

*Primary Examiner* — Simon Nguyen
(74) *Attorney, Agent, or Firm* — Dickinson Wright PLLC (57) ABSTRACT

A vehicle display apparatus for enabling use of a wireless portable electronic device with a vehicle includes a processor, and a display, a transceiver, and memory each coupled to the processor. The memory contains program instructions that, when executed, cause the processor to receive data at the transceiver over a first wireless connection with a wireless headgear apparatus. The wireless headgear apparatus is in communication with the wireless mobile device over a second wireless connection. The program instructions are further configured to cause the processor to display information related to the wireless mobile device on the display based on the received data, to receive a user selection related to operation of the wireless mobile device via a (Continued)

user interface in communication with the processor, and to transmit the user selection to the wireless headgear apparatus.

18 Claims, 4 Drawing Sheets

(51) Int. Cl.
  *H04B 1/3827* (2015.01)
  *H04M 1/725* (2006.01)
  *H04W 4/80* (2018.01)
(52) U.S. Cl.
  CPC ........... *H04M 1/7253* (2013.01); *H04W 4/80* (2018.02); *H04B 2001/3866* (2013.01); *H04M 2250/02* (2013.01)
(58) Field of Classification Search
  USPC ................................. 455/569.1–569.2, 575.2
  See application file for complete search history.

(56) References Cited

U.S. PATENT DOCUMENTS

| | | | |
|---|---|---|---|
| 2003/0092384 A1 | 5/2003 | Ross, III | |
| 2004/0097263 A1* | 5/2004 | Katayama | H04L 12/462 455/556.1 |
| 2006/0121950 A1* | 6/2006 | Lee | H04M 1/05 455/569.1 |
| 2008/0014865 A1* | 1/2008 | Roberts | H04W 4/10 455/11.1 |
| 2008/0220718 A1* | 9/2008 | Sakamoto | H04B 1/385 455/41.2 |
| 2009/0186665 A1* | 7/2009 | Kim | B60R 11/0241 455/569.2 |
| 2011/0081861 A1* | 4/2011 | Kuo | A42B 3/30 455/41.3 |
| 2014/0002357 A1 | 1/2014 | Pombo | G06F 3/012 345/158 |
| 2015/0080061 A1* | 3/2015 | Dieringer | H04M 1/6066 455/569.1 |

* cited by examiner

FIG. 8

WIRELESS COMMUNICATION SYSTEMS AND METHODS WITH VEHICLE DISPLAY AND HEADGEAR DEVICE PAIRING

CROSS REFERENCE TO RELATED APPLICATIONS

The present application is a U.S. National Stage of International Application No. PCT/US2014/044425 filed on Jun. 26, 2014, the entire disclosure of which is incorporated herein by reference.

BACKGROUND

Automobiles are the dominant form of transportation in many developed areas of the world, such as North America, Europe and Japan. In such areas, a motorcycle is often considered a recreational vehicle. Motorcycles, scooters, and other two-wheeled or three-wheeled vehicles, however, are often the primary mode of transportation in much more populous developing areas such as India, China, and southeast Asia. In such areas, motorcycles are often considered a more efficient, affordable, and utilitarian mode of transportation as opposed to a recreational second or third vehicle.

Similarly, developed areas of the world have made significant investments in wired telecommunications infrastructure, and the use of wireless mobile devices, such as smartphones, for wireless communication is often in addition to a fixed or land line telephone. The use of wireless mobile devices as a primary communication device, and in general, is much more prevalent in more populous developing areas. In such areas, the ease with which mobile phones may be accessed compared with other resources has led to their use as a primary tool to build an educate in addition to recreational purposes.

While two-wheeled and three-wheeled vehicles and mobile phones may be popular as the primary modes of transportation and communication in developing areas, the coexistence of these technologies presents many difficulties and has been largely unfeasible. For example, most countries have laws and regulations providing that users of two-wheeled and three-wheeled vehicles must wear safety helmets or other protective headgear while operating such vehicles. Such safety helmets typically provide sufficient physical obstruction to prevent wearers from effectively listening or speaking during a call from a mobile phone. Thus, users of two-wheeled and three-wheeled vehicles must discontinue operation of the vehicle and remove the helmet in order to make or receive calls, which is often neither convenient nor practical.

One proposed solution integrates a wireless "hands-free" headset (e.g., a headset operating according to Bluetooth standards and/or protocols) with a safety helmet such that calls received on a mobile phone may be answered while the wearer of the safety helmet operates a motorcycle. The wearer of the safety helmet is essentially able to listen and speak during calls using a speaker and microphone placed inside the helmet rather than holding the mobile device against his or her head, which would be prevented by the helmet. This proposed solution, however, does not provide the user with visual information regarding, for example, call status or mobile phone operation, such that calls may be effectively managed while operating the motorcycle. In order to access visual information, the vehicle operator must try to access and operate the mobile phone itself, which can be difficult at best and likely very dangerous. There is an ongoing need for improved wireless communication systems and methods that provide operators of vehicles, such as two-wheeled or three-wheeled vehicles, with visual information regarding status and operation of a mobile device while wearing protective headgear.

SUMMARY

According to an exemplary embodiment, a vehicle display apparatus for enabling use of a wireless mobile device with a vehicle includes a processor, and a display, a transceiver, and memory each coupled to the processor. The memory contains program instructions that, when executed, cause the processor to receive data at the transceiver over a first wireless connection with a wireless headgear apparatus. The wireless headgear apparatus is in communication with the wireless mobile device over a second wireless connection. The program instructions are further configured to cause the processor to display information related to the wireless mobile device on the display based on the received data, to receive a user selection related to operation of the wireless mobile device via a user interface in communication with the processor, and to transmit the user selection to the wireless headgear apparatus.

According to another exemplary embodiment, a headgear apparatus for enabling use of a wireless mobile device with a vehicle includes a headgear structure, a speaker and a microphone coupled to the headgear structure, and a communication module coupled to the headgear structure. The communication module is configured to establish a first wireless connection with the wireless mobile device, establish a second wireless connection with the vehicle, to transmit data related to the wireless mobile device to the vehicle for display, and to receive a user selection related to operation of the wireless mobile device from the vehicle.

According to another exemplary embodiment, a system for enabling use of a wireless mobile device with a vehicle includes a headgear apparatus including a speaker, a microphone, and a communication module each coupled to a headgear structure. The system also includes a vehicle display apparatus including a processor and a further including a display, a transceiver, and memory each coupled to the processor. The communication module is configured to establish a first wireless connection with the wireless mobile device, establish a second wireless connection with the vehicle display apparatus, transmit data related to the wireless mobile device to the vehicle display apparatus for display, and receive a user selection related to operation of the wireless mobile device from the vehicle display apparatus. The memory includes program instructions that, when executed, cause the processor to receive the data related to the wireless mobile device, display information related to the wireless mobile device on the display based on the received data, receive the user selection related to operation of the wireless mobile device via a user interface in communication with the processor, and transmit the user selection to the headgear apparatus.

DETAILED DESCRIPTION

According to various exemplary systems and methods, visual information regarding status or operation of a wireless mobile device, such as a wireless phone, may be provided to the operator of a vehicle, such as a motorcycle, by wirelessly pairing a headgear apparatus worn by the operator with a display apparatus on the vehicle. An exemplary system may include a headgear apparatus including a speaker, a microphone, and a communication module each coupled to a headgear structure, such as a safety helmet. The system may also include a vehicle display apparatus, such as an instrument cluster, having a display and a transceiver.

The communication module in the headgear apparatus may be configured to establish a wireless connection with the wireless mobile device. In some embodiments, such connection may be, for example, a connection using Bluetooth data transmission (e.g., using a wireless transceiver compatible with Bluetooth standards and/or protocols). The communication module in the headgear apparatus may also be configured to establish a wireless connection with the vehicle display apparatus. In some embodiments, such connection may, for example, use infrared data transmission (e.g., using an infrared wireless transceiver compatible with infrared standards and/or protocols).

The communication module in the headgear apparatus may also be configured to transmit data related to the wireless mobile device to the vehicle display apparatus for display. In some embodiments, such data may include information such as incoming call alerts, call status, caller identity, call duration, etc. The communication module in the headgear apparatus may also be configured to receive data regarding a user selection related to controlling the operation of the wireless mobile device from the vehicle display apparatus. In some embodiments, such data may include, for example, instructions to answer and end calls received by the wireless mobile device, to place calls, to place calls on hold, etc.

The vehicle display apparatus may be configured to receive the data related to the wireless mobile device and to display information related to the wireless mobile device based on the received data. In some embodiments, such information may include call information such as incoming call alerts, call status, caller identity, call duration, etc. The vehicle display apparatus may also be configured to receive the user selection related to operation of the wireless mobile device via a user interface. In some embodiments, the user interface may include, for example, a graphical user interface and a touch screen integrated with the display. The graphical user interface may display one or more options regarding operation of the wireless mobile device. Such options may include, for example, instructions to answer and end calls received by the wireless mobile device, to place calls, to place calls on hold, etc. The vehicle display apparatus may also be configured to transmit data regarding the user selection to the wireless headgear apparatus.

As will be appreciated, the improved wireless communication systems and methods disclosed herein may provide operators of two-wheeled or three-wheeled vehicles, such as motorcycles, with visual information regarding status and operation of a wireless mobile device, such as a mobile phone, while wearing protective headgear, such as a helmet. Advantageously, the operator of the vehicle may receive such information without the need to inconveniently or impractically discontinue operation of the motor vehicle in order to remove the protective headgear. The operator of the vehicle may also receive such information without the difficulty and danger involved in trying to access and operate the wireless mobile device itself.

Figure 1:
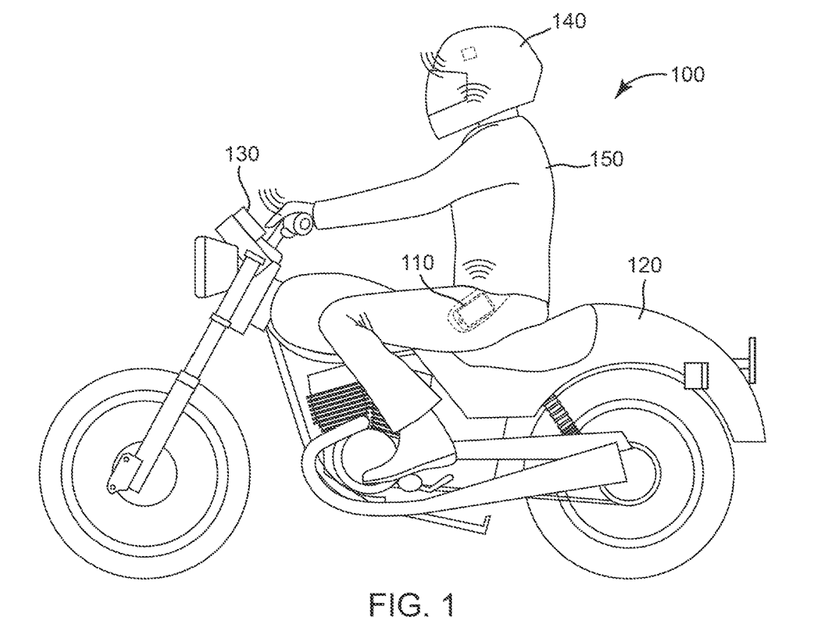
FIG. 1 is a diagram illustrating an exemplary system for enabling use of a wireless mobile device with a vehicle.

FIG. 1 is a diagram illustrating an exemplary system 100 for enabling use of a wireless mobile device 110 with a vehicle 120. Wireless mobile device 110 may be, for example, a mobile or cellular phone, smart phone, personal digital assistant (PDA) tablet device, laptop computer, etc. Wireless mobile device 110 may be configured to communicate and interact with other devices having wireless capabilities. For example, wireless mobile device 110 may use one or more wireless transceivers to communicate voice or audio content and/or to exchange status information, control commands and operational instructions via one or more suitable communication networks and/or protocols including (e.g., the Internet, a cellular network, near field communication (NFC), a Bluetooth standard connection, Wi-Fi, Wi-Max, infrared, a proprietary network, etc.). Wireless mobile device 110 may be a computer device or system (e.g., comprising one or more processors) configured to execute instructions, send and receive data stored in non-transitory memory, and perform other operations to implement the operations and functions described herein. For example, wireless mobile device 110 be configured to execute one or more mobile or software applications, such as a wireless phone application, a music player, a mapping application with Global Positioning System (GPS) capabilities, an Internet browser, etc.

Vehicle 120 may be, for example, a two-wheeled or three wheeled vehicle, or any vehicle for which the operation thereof may require the use of protective headgear. For example, vehicle 120 may be a motorcycle, scooter, motorized bicycle, all-terrain vehicle (ATV), etc. Other types of vehicles are contemplated as well.

System 100 may include a vehicle display apparatus 130 and a headgear apparatus 140. Vehicle display apparatus 130 may include, for example, an instrument cluster or other display device, configured to be fixed or removably coupled to, integrated with, or supported by vehicle 120 in any number of ways. For example, in some embodiments, vehicle display apparatus 130 may be functionally integrated with one or more vehicle displays. In some embodiments, vehicle display apparatus 130 may be a single or multiple units configured to be integrated with a dashboard or console of vehicle 120. In some embodiments, vehicle display apparatus 130 may be a stand-alone device configured to be fixedly mounted (e.g., using suitable hardware, bracketry, etc.) or removably mounted to or otherwise supported by (e.g., using a hanger, spring clip, etc.) a handlebar or other frame member such that it is visible to a vehicle operator 150. Vehicle display apparatus 130 may include, for example, an LCD, CRT or other type of display configured to communicate information to vehicle operator 150, such as information pertaining to the status or operation of vehicle 120 and/or the status and operation of wireless mobile device 110. Vehicle display apparatus 130 may also include a wireless transceiver configured for pairing and communication with headgear apparatus 140 using a suitable communication network or protocol.

Headgear apparatus 140 may include, for example, a protective headgear structure, such as a bicycle or motorcycle helmet, configured to be worn by vehicle operator 150 during operation of vehicle 120 and to protect the head of vehicle operator 150 from injury. The protective headgear structure may also be, for example, protective glasses, hearing protectors, and other structures. Various non-protective headgear structures configured to be worn by vehicle operator 150 are contemplated as well. Headgear apparatus 140 may also include one or more wireless transceivers configured for pairing and communication with wireless mobile device 110 and vehicle display apparatus 130 using a suitable communication network and/or protocol.

Figure 2:
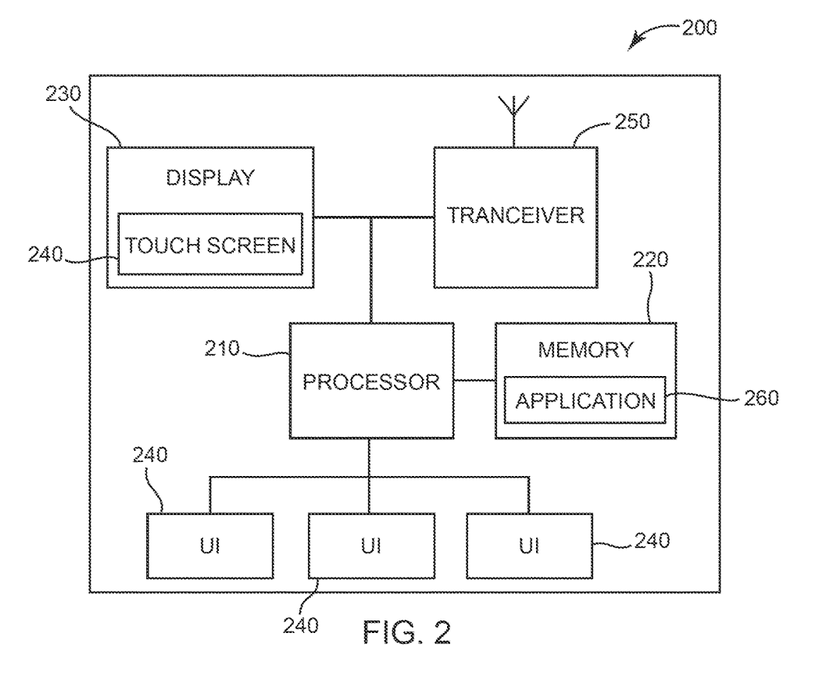
FIG. 2 is a block diagram illustrating an exemplary vehicle display apparatus in greater detail.

Referring now to FIG. 2, an exemplary vehicle display apparatus 200 is shown in greater detail. Vehicle display apparatus 200 may include a processor 210, a system memory 220 and a system bus that couples various system components including system memory 220 to processor 210. Processor 210 may be implemented in hardware, firmware, software, or any combination of these methods. Vehicle display apparatus 200 may have one or more processors 210 that use the same or a different processing technology. Additionally, processor 210 may be a separate component of vehicle display apparatus 200 or may be embedded within or distributed among other components of vehicle display apparatus 200 (e.g., integrated with a display driver or transceiver), or another system or component. Processor 210 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. Processor 210 may execute one or more applications configured to implement the functionality described herein.

System memory 220 may be, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), optical storage, magnetic disk storage or other magnetic storage devices, or any other medium which may be used to carry or store desired program code in the form of machine-executable instructions or data structures and which may be accessed by a general purpose or special purpose computer or other machine. Vehicle display apparatus 200 may have one or more system memories 220 that use the same or a different memory technology. Additionally, system memory 220 may be a separate component of vehicle display apparatus 200 or may be embedded within or distributed among other components of vehicle display apparatus 200 (e.g., integrated with a display driver or transceiver), or another system or component. System memory 220 may store applications configured to implement the functionality described herein in addition to other instructions or information.

Vehicle display apparatus 200 may also include one or more displays 230 in communication with processor 210 (e.g., using a suitable display driver). Display 230 may be, for example, an LCD, CRT or other type of display configured to communicate information to a vehicle operator in a format that is easily visible in daytime as well as nighttime driving conditions. Display 230 may be configured to communicate information to a vehicle operator, such as information pertaining to the status or operation of vehicle 120 and/or the status and operation of a wireless mobile device (e.g., wireless mobile device 110 shown in FIG. 1). For example, in some embodiments, display 230 may be a multifunction central display unit configured to display vehicle speed, engine RPM, transmission information, fuel levels, mileage, etc., in addition to information about other systems and devices, such as a vehicle audio system and/or a wireless mobile device. In some embodiments, display 230 may be a stand-alone display dedicated to displaying information from a single source, such as a wireless mobile device.

In particular, display 230 may be configured to display status information based on data received from a wireless mobile device. Such information may include, for example, information from a wireless phone application executed by the wireless mobile device and containing incoming call alerts, call status, caller identity, call duration, etc. In some embodiments, display 230 may also be configured to display information related to operation of the wireless phone application on the wireless mobile device. Such information may include, for example, a user interface that allows an operator of a vehicle to answer and end calls received by the wireless mobile device, to place calls, to place calls on hold, etc. In some embodiments, display 230 may be configured to display information related to the status and operation of other applications executed by the wireless mobile device, such as a music player application (e.g., track, album, artist, and elapsed time information as well as play, pause, stop, skip, and other controls) or a map application (e.g., maps, directions, scan and zoom controls, etc.).

Vehicle display apparatus 200 may also include one or more user interface devices 240 in communication with processor 210. User interface device 240 may be, for example, a touch screen (e.g., integrated with display 230), a keypad, joystick, cursor control device, one or more switches or buttons, or other devices performing a similar function. User interface device 240 may be configured to, for example, allow a user to interact with vehicle display apparatus 200 and provide input in response to applications executed by processor 210. In some embodiments, user interface device 240 may be a touch screen integrated with display 230 that may be configured to interact with a graphical user interface presented on display 230. For example, the touch screen may allow users to review, scroll, scan, navigate, cycle through, or otherwise manipulate information displayed on display 230 (e.g., incoming call alerts, call status, caller identity, call duration associated with a mobile phone application executed on a wireless mobile device).

In some embodiments, the touch screen may be configured to receive user selections related to operation of a wireless mobile device. For example, the graphical user interface may display one or more selectable options (e.g., via buttons, icons or other interactive graphical images displayed on display 230) regarding operation of a mobile phone application executed on the wireless mobile device. Such options may include, for example, instructions to answer and end calls received by the wireless mobile device, to place calls, to place calls on hold, etc. In some embodiments, the user may touch or tap the corresponding button, icon, or other interactive graphical image displayed on display 230 to select one of the options. In some embodiments, the corresponding graphical image may be displayed on display 230 for labeling or informational purposes, and the user may actuate a separate button, switch, or other user interface device 240 on vehicle display apparatus 200 to select one of the options. In some embodiments, display 230 may be configured to display selectable options related to operation of other applications executed by the wireless mobile device, such as a music player application (e.g., track, album, artist, and elapsed time information as well as play, pause, stop, skip, and other controls) or a map application (e.g., maps, directions, scan and zoom controls, etc.). Upon receiving a user selection related to operation of the wireless mobile device from user interface device 240, processor 210 may generate an appropriate control command, operational instruction, or other information regarding the user selection to be transmitted to a headgear apparatus (e.g., headgear apparatus 140 shown in FIG. 1) in communication with vehicle display apparatus 200.

Figure 3:
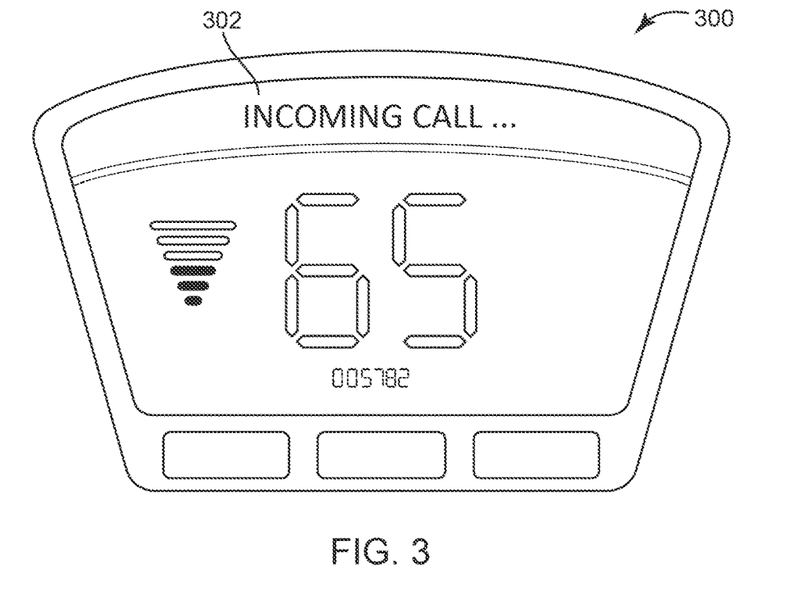
FIG. 3 is a depiction of an exemplary display of information related to a wireless mobile device on a vehicle display apparatus.

Referring now to FIG. 3, a depiction of an exemplary display of information 300 related to a wireless mobile device on a vehicle display apparatus is shown. As shown in FIG. 3, display of information 300 may convey text or other graphical information regarding the status of a wireless mobile device. For example, in the illustrated embodiment, display of information 300 includes message text 302 indicating that a wireless mobile device (e.g., wireless mobile device 110 shown in FIG. 1) has received an incoming call is displayed on a vehicle display apparatus (e.g., vehicle display apparatus 200 shown in FIG. 2). In some embodiments, display of information 300 may be interactive, such that a user may review, scroll, scan, navigate, cycle through, or otherwise manipulate the information displayed via one or more user interface devices (e.g., a user interface device 240 shown in FIG. 2).

Figure 4:
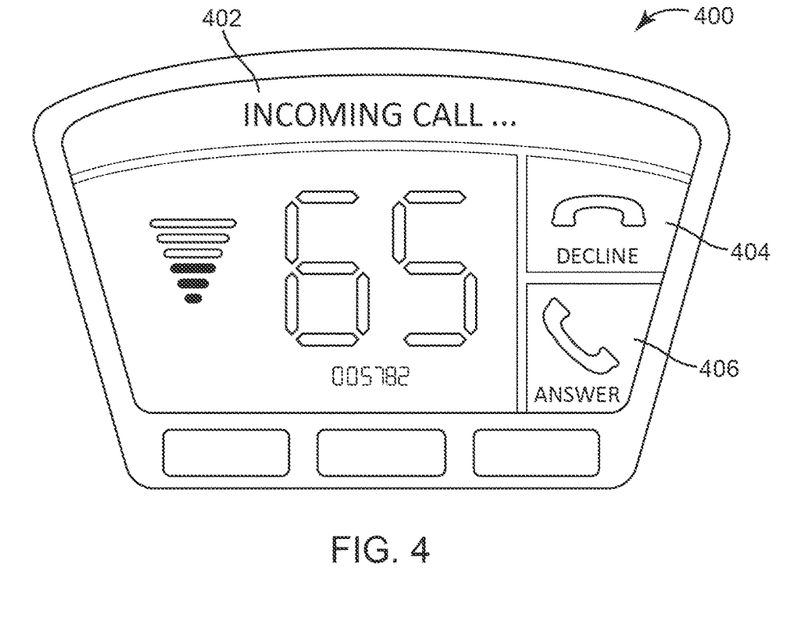
FIG. 4 is a depiction of another exemplary display of information related to a wireless mobile device on a vehicle display apparatus.

Referring now to FIG. 4, a depiction of an exemplary display 400 of information related to a wireless mobile device on a vehicle display apparatus is shown. As shown in FIG. 4, display 400 may convey text or other graphical information regarding the control or operation of a wireless mobile device. For example, in the illustrated embodiment, display 400 includes a message 402 indicating that a wireless mobile device (e.g., wireless mobile device 110 shown in FIG. 1) has received an incoming call is displayed on a vehicle display apparatus (e.g., vehicle display apparatus 200 shown in FIG. 2). Display 400 also includes graphics (e.g., buttons) 404 and 406. In some embodiments, where the vehicle display apparatus includes a touch screen user interface device, a user may decline the incoming call by, for example, touching or tapping graphical button 404. Similarly, a user may answer the incoming call by, for example, touching or tapping graphical button 406. In some embodiments, graphics 404 and/or 406 may be displayed for labeling or informational purposes, and the user may actuate a separate button, switch, or other user interface on the vehicle display apparatus to select one of the options.

Referring again to FIG. 2, vehicle display apparatus 200 may also include a wireless transceiver 250 in communication with processor 210. Wireless transceiver 250 may be configured for pairing and communication with other devices having wireless capabilities using a suitable network and/or protocol. For example, in some embodiments, wireless transceiver 250 may be a transceiver operating according to infrared standards and/or protocols, such as IrDA standards and/or protocols, in order to pair, communicate, and interact with other devices having wireless capabilities. In some embodiments, wireless transceiver 250 may be a transceiver operating according to Bluetooth standards and/or protocols, such as the Bluetooth Hands Free Profile (HFP) and or other Bluetooth profiles, in order to pair, communicate, and interact with other devices having wireless capabilities.

According to an exemplary embodiment, wireless transceiver 250 may utilize wireless infrared standards and/or protocols to enable vehicle display apparatus 200 to exchange status information, control commands, and operational instructions regarding a wireless mobile device with a headgear apparatus having suitable wireless infrared capabilities. For example, wireless transceiver 250 may be configured to receive data from the headgear apparatus including information from a wireless phone application executed by the wireless mobile device. Such information may include incoming call alerts, call status, caller identity, call duration, etc. Wireless transceiver 250 may also be configured to transmit information related to user selection regarding operation of the wireless mobile device to the headgear apparatus. Such information may include, for example, instructions to answer and end calls received by the wireless mobile device, to place calls, to place calls on hold, etc. In some embodiments, wireless transceiver 250 may be configured to receive and transmit information related to the status and operation of other applications executed by the wireless mobile device, such as a music player application (e.g., track, album, artist, and elapsed time information as well as play, pause, stop, skip, and other controls) or a map application (e.g., maps, directions, scan and zoom controls, etc.).

Vehicle display apparatus 200 may also include an application 260 stored in memory 220. Application 260 may be, for example, one or more program modules including routines, programs, objects, components, data structures, etc. that perform particular tasks or implement particular abstract data types. Application 260 may be written using, for example, one or more programming languages, assembly languages, scripting languages, etc. According to an exemplary embodiment, application 260 may be an organized set of instructions that, when executed, cause processor 210 to implement the functionality described above with respect to the various components of vehicle display apparatus 260.

Figure 5:
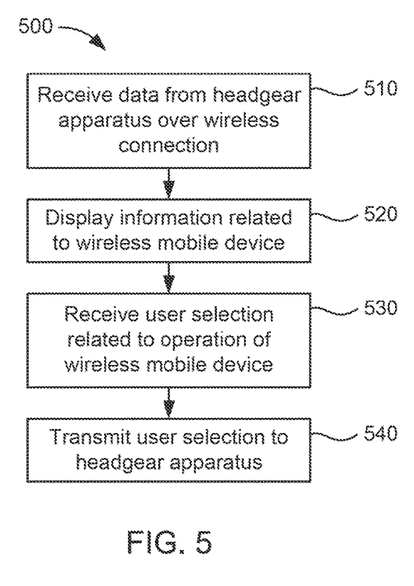
FIG. 5 is a flow diagram of an exemplary process for wireless communication between a vehicle display apparatus and a headgear apparatus.

For example, referring now to FIG. 5, an exemplary process 500 for enabling use of a wireless mobile device with a vehicle that may be carried out upon execution of application 260 by processor 260 (shown in FIG. 2) is shown. At a step 510, data may be received over a wireless connection (e.g., an infrared connection) with a wireless headgear apparatus (e.g., using wireless transceiver 250 shown in FIG. 2), where the wireless headgear apparatus in communication with the wireless mobile device over another wireless connection. At a step 520, information related to the wireless mobile device may be displayed (e.g., on display 230 shown in FIG. 2) based on the received data. Such information may include, for example, information from a wireless phone application executed by the wireless mobile device and containing incoming call alerts, call status, caller identity, call duration, etc. Such information may also include one or more selectable options regarding operation of a mobile phone application executed on the wireless mobile device. Such options may include, for example, instructions to answer and end calls received by the wireless mobile device, to place calls, to place calls on hold, etc. At a step 530, a user selection related to operation of the wireless mobile device may be received (e.g., via a user interface 240 shown in FIG. 2). At a step 540, the user selection may be transmitted to the wireless headgear apparatus (e.g., over the infrared connection via transceiver 250 shown in FIG. 2). Similar processes may be used to, for example, receive and transmit information related to the status and operation of other applications executed by the wireless mobile device, such as a music player application, a map application, etc.

Figure 6:
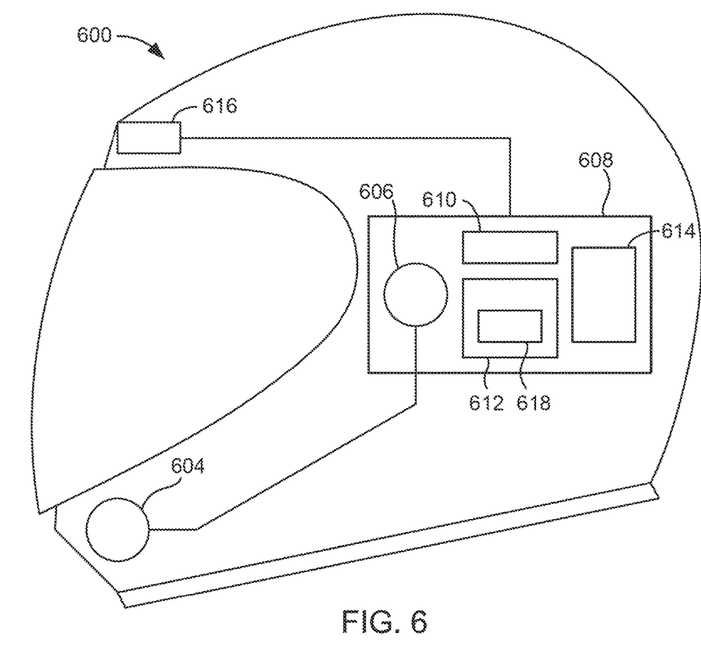
FIG. 6 is a diagram illustrating an exemplary headgear apparatus in greater detail.

Referring now to FIG. 6, an exemplary headgear apparatus 600 is shown in greater detail. Headgear apparatus may include a headgear structure 602, as well as a speaker 604, a microphone 606, and a communication module 608 each coupled to a headgear structure. Headgear apparatus 600 may generally be configured to establish a wireless connection with a wireless mobile device (e.g., wireless mobile device 110 shown in FIG. 1) and also to establish a wireless connection with a vehicle display apparatus of a vehicle (e.g., vehicle display apparatus 130 shown in FIG. 1). Headgear apparatus 600 may also be configured to transmit data related to the wireless mobile device to the vehicle display apparatus for display, and to receive a user selection related to operation of the wireless mobile device from the vehicle.

Headgear structure 602 may be a structure such as a protective bicycle or motorcycle safety helmet configured to be worn on the head of a vehicle operator while operating a vehicle to protect the head of the vehicle operator from injury. Various non-protective headgear structures configured to be worn by a vehicle operator are contemplated as well. For example, headgear structure 602 may be protective glasses, hearing protectors, and other structures. Microphone 604 and speaker 606 may be any microphone and or speaker configured for use with headgear structure 602 and for mobile device audio applications. Microphone 604 and speaker 606 may be permanently integrated with or supported by headgear structure 602, may be removably coupled to or supported by headgear structure 602, or may be otherwise configured to be worn by a vehicle operator while wearing headgear structure 602. Microphone 604 may be positioned, for example, at a location near the mouth of the vehicle operator to receive voice input, and speaker 606 may be positioned near the right or left ear of the vehicle operator to convey audio output. Multiple microphones 604 and speakers 606 (e.g., both right and left ears for mono or stereo applications), as well as alternative or multiple placements of these devices are contemplated as well.

Communication module 608 may include a processor 610, a system memory 612, wireless transceivers 614 and 616, and a system bus that couples various system components including system memory 612 to processor 610. Microphone 604 and speaker 606 may be permanently or removably coupled to communication module 608 via one or more suitable input or output connections. In some embodiments, one or both of microphone 604 and speaker 606 may be permanently or removably integrated with communication module 608.

Processor 610 may be implemented in hardware, firmware, software, or any combination of these methods. Communication module 608 may have one or more processors 610 that use the same or a different processing technology. Additionally, processor 610 may be a separate component of communication module 608 or may be embedded within or distributed among other components of communication module 608 or headgear apparatus 600 (e.g., integrated with a transceiver). Processor 610 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. Processor 610 may execute one or more applications configured to implement the functionality described herein.

System memory 612 may be, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), optical storage, magnetic disk storage or other magnetic storage devices, or any other medium which may be used to carry or store desired program code in the form of machine-executable instructions or data structures and which may be accessed by a general purpose or special purpose computer or other machine. Communication module 608 may have one or more system memories 612 that use the same or a different memory technology. Additionally, system memory 612 may be a separate component of communication module 608 or may be embedded within or distributed among other components of communication module 608 or headgear apparatus 600. System memory 612 may store applications configured to implement the functionality described herein in addition to other instructions or information.

Wireless transceivers 614 and 616 may be configured for pairing and communication with other devices having wireless capabilities using a suitable network and/or protocol. For example, in some embodiments, wireless transceivers 614 and 616 may be transceivers operating according to infrared standards and/or protocols, such as IrDA standards and/or protocols, in order to pair, communicate, and interact with other devices having wireless capabilities. In some embodiments, wireless transceivers 614 and 616 may be a transceivers operating according to Bluetooth standards and/or protocols, such as the Bluetooth Hands Free Profile (HFP) and or other Bluetooth profiles, in order to pair, communicate, and interact with other devices having wireless capabilities. In some embodiments, wireless transceivers 614 and 616 may be replaced by a single wireless transceiver operating according to Bluetooth standards and/or protocols or infrared standards and/or protocols. In some embodiments, one of wireless transceivers 614 and 616 may operate according to Bluetooth standards and/or protocols, and the other may operate according to infrared standards and/or protocols. Other combinations of suitable communications standards and/or protocols are contemplated as well.

In some embodiments, wireless transceivers 614 and 616 may be permanently or removably integrated with communications module 608. In some embodiments, one or both of wireless transceivers 614 and 616 may be remotely located from communications module 608 (e.g., as separate modules permanently or removably integrated with or supported by another component of headgear apparatus 600) and permanently or removably coupled to communications module 608 by one or more suitable input or output connections. According to an exemplary embodiment, transceiver 614 may be a transceiver operating according to Bluetooth standards and/or protocols and integrated with communication module 608, and transceiver 616 may be a transceiver operating in accordance with infrared standards and/or protocols and remotely located from communication module 608 (e.g., on the front of headgear structure 608 as shown in FIG. 6 to facilitate line-of-sight communication with a vehicle display apparatus).

According to an exemplary embodiment, wireless transceiver 614 may utilize wireless infrared standards and/or protocols to enable headgear apparatus 600 to exchange status information, control commands, and operational instructions regarding a wireless mobile device with a vehicle display apparatus having suitable wireless infrared capabilities. For example, wireless transceiver 614 may be configured to transmit data to the vehicle display apparatus including information from a wireless phone application executed by a wireless mobile device. Such information may include incoming call alerts, call status, caller identity, call duration, etc. Wireless transceiver 614 may also be configured to receive data including information related to a user selection regarding operation of the wireless mobile device from the vehicle display apparatus. Such information may include, for example, instructions to answer and end calls received by the wireless mobile device, to place calls, to place calls on hold, etc. In some embodiments, wireless transceiver 614 may be configured to receive and transmit information related to the status and operation of other applications executed by the wireless mobile device, such as a music player application (e.g., track, album, artist, and elapsed time information as well as play, pause, stop, skip, and other controls) or a map application (e.g., maps, directions, scan and zoom controls, etc.).

According to an exemplary embodiment, wireless transceiver 616 may utilize Bluetooth standards and/or protocols to enable headgear apparatus 600 to exchange voice or audio content, status information, control commands, and operational instructions with a wireless mobile device having suitable wireless infrared capabilities. For example, wireless transceiver 616 may be configured to receive data including information from a wireless phone application executed by a wireless mobile device. Such information may include voice or audio content (e.g., for reproduction by speaker 606), as well as incoming call alerts, call status, caller identity, call duration, etc. (e.g., to be transmitted to a vehicle display apparatus). Wireless transceiver 616 may also be configured to transmit voice or audio content (e.g., from microphone 604), as well as information related to user selections regarding operation of the wireless mobile device received from the vehicle display apparatus. Such information may include, for example, instructions to answer and end calls received by the wireless mobile device, to place calls, to place calls on hold, etc. In some embodiments, wireless transceiver 616 may be configured to receive and transmit voice or audio content and information related to the status and operation of other applications executed by the wireless mobile device, such as a music player application (e.g., audio signals as well as track, album, artist, and elapsed time information as well as play, pause, stop, skip, and other controls) or a map application (e.g., maps, audio and visual directions, scan and zoom controls, etc.).

Headgear apparatus 600 may also include an application 618 stored in memory 612. Application 618 may be, for example, one or more program modules including routines, programs, objects, components, data structures, etc. that perform particular tasks or implement particular abstract data types. Application 618 may be written using, for example, one or more programming languages, assembly languages, scripting languages, etc. According to an exemplary embodiment, application 618 may be an organized set of instructions that, when executed, cause processor 610 to implement the functionality described above with respect to the various components of headgear apparatus 600.

Figure 7:
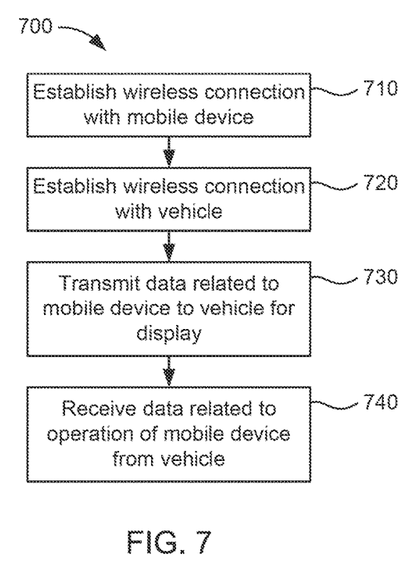
FIG. 7 is a flow diagram of an exemplary process for wireless communication among a headgear apparatus, vehicle display apparatus, and a wireless mobile device.

For example, referring now to FIG. 7, an exemplary process 700 for wireless communication among a headgear apparatus, vehicle display apparatus, and a wireless mobile device that may be carried out upon execution of application 618 by processor 610 (shown in FIG. 6) is shown. At a step 710, a wireless connection may be established with a wireless mobile device (e.g., using wireless transceiver 614 shown in FIG. 6 to establish wireless communication with wireless mobile device 110 shown in FIG. 1). The wireless connection may be, for example, a wireless connection using Bluetooth standards and/or protocols. At a step 720, a wireless connection may be established with a vehicle (e.g., using wireless transceiver 614 shown in FIG. 6 to establish wireless communication with vehicle display apparatus 130 shown in FIG. 1). The wireless connection may be, for example, a wireless connection using infrared standards and/or protocols.

At a step 730, data related to the wireless mobile device may be transmitted to the vehicle for display. Such data may include, for example, information from a wireless phone application executed by the wireless mobile device and containing incoming call alerts, call status, caller identity, call duration, etc. At a step 740, data including information regarding a user selection related to operation of the wireless mobile device may be received from the vehicle. Such information may include, for example, one or more selectable options regarding operation of a mobile phone application executed on the wireless mobile device. Such options may include, for example, instructions to answer and end calls received by the wireless mobile device, to place calls, to place calls on hold, etc. Similar processes may be used to, for example, receive and transmit information related to the status and operation of other applications executed by the wireless mobile device, such as a music player application, a map application, etc.

Referring again to FIG. 6, in some embodiments application 618 may be configured to convert data adapted for use with a particular wireless communication standard and/or protocol to another wireless communication standard and/or protocol. For example, in some embodiments, transceiver 614 may utilize Bluetooth standards and/or protocols and transceiver 616 may utilize infrared standards and/or protocols. Application 618 may be configured to convert data received from a mobile device by transceiver 614 using Bluetooth standards and/or protocols into data that may be transmitted to a vehicle display apparatus by transceiver 616 using infrared standards and/or protocols. Conversion between other data transmission standards and/or protocols is contemplated as well.

Figure 8:
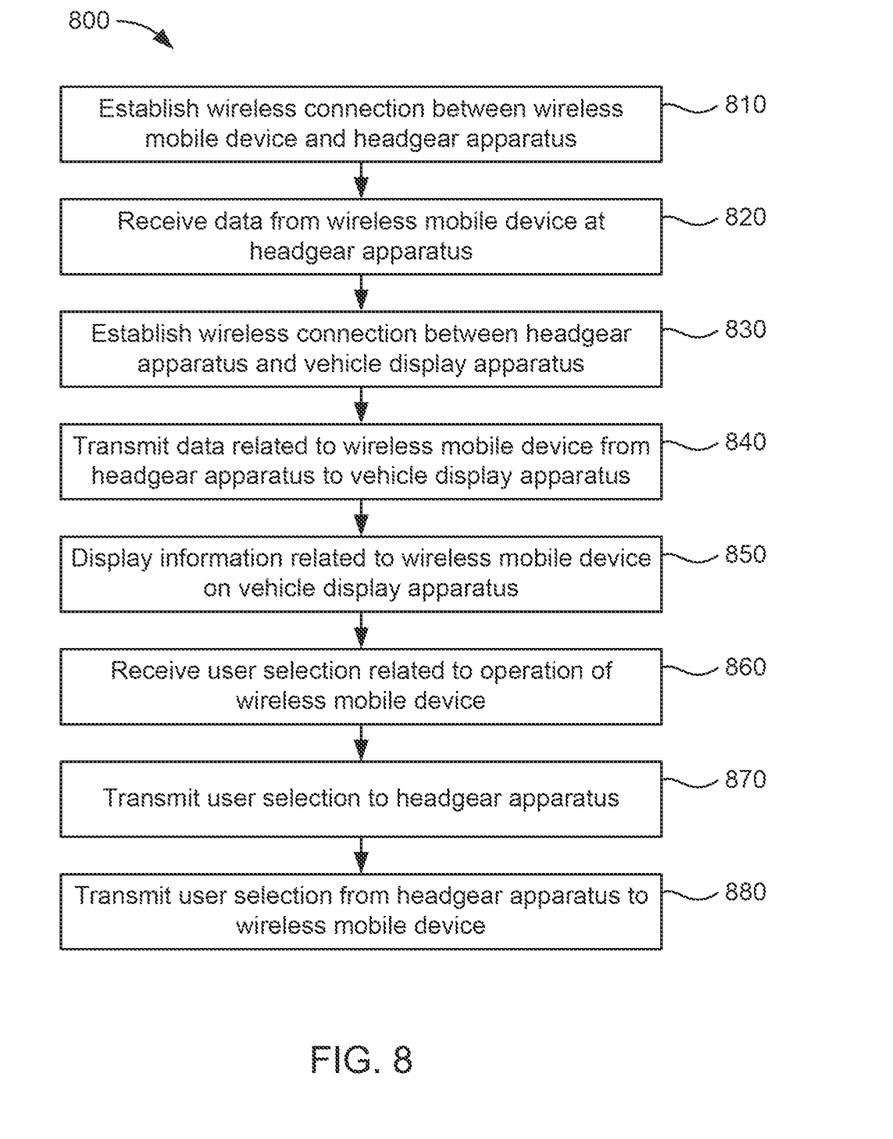
FIG. 8 is a flow diagram of an exemplary process for enabling use of a wireless mobile device with a vehicle.

Referring now to FIG. 8, an exemplary process 800 for enabling use of a wireless mobile device with a vehicle is shown. At a step 810, a headgear apparatus (e.g., headgear apparatus 140 shown in FIG. 1) may establish a wireless connection with a wireless mobile device (e.g., wireless mobile device 110 shown in FIG. 1). The wireless connection may be, for example, a wireless connection using Bluetooth standards and/or protocols. At a step 820, the headgear apparatus may receive data from the wireless mobile device. For example, the headgear apparatus may receive data including information from a wireless phone application executed by a wireless mobile device. Such information may include voice or audio content for reproduction by the headgear apparatus (e.g., speaker 606 shown in FIG. 6), as well as incoming call alerts, call status, caller identity, call duration, etc. to be transmitted to a vehicle display apparatus (e.g., vehicle display apparatus 130 shown in FIG. 1).

At a step 830, the headgear apparatus may establish a wireless connection with the vehicle display apparatus. The wireless connection may be, for example, a wireless connection using infrared standards and/or protocols. At a step 840, the headgear apparatus may transmit data related to the wireless mobile device to the vehicle for display. Such data may include, for example, information from a wireless phone application executed by the wireless mobile device and containing incoming call alerts, call status, caller identity, call duration, etc.

At a step 850, the vehicle display apparatus may display information related to the wireless mobile device (e.g., on display 230 shown in FIG. 2) based on the received data. Such information may include, for example, information from a wireless phone application executed by the wireless mobile device and containing incoming call alerts, call status, caller identity, call duration, etc. Such information may also include one or more selectable options regarding operation of a mobile phone application executed on the wireless mobile device. Such options may include, for example, instructions to answer and end calls received by the wireless mobile device, to place calls, to place calls on hold, etc. At a step 860, a user selection related to operation of the wireless mobile device may be received by the vehicle display apparatus (e.g., via a user interface 240 shown in FIG. 2). At a step 870, the user selection may be transmitted to the headgear apparatus.

At a step 880, the headgear apparatus may transmit voice or audio content (e.g., from microphone 604 shown in FIG. 6), and/or information related to the user selection regarding operation of the wireless mobile device received from the vehicle display apparatus. Such information may include, for example, instructions to answer and end calls received by the wireless mobile device, to place calls, to place calls on hold, etc. In some embodiments, voice or audio content and information related to the status and operation of other applications executed by the wireless mobile device, such as a music player application (e.g., audio signals as well as track, album, artist, and elapsed time information as well as play, pause, stop, skip, and other controls) or a map application (e.g., maps, audio and visual directions, scan and zoom controls, etc.) may be received and transmitted. Other applications are contemplated as well.

The embodiments in the present disclosure have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A vehicle display apparatus for enabling use of a wireless mobile device with a vehicle, comprising:
   a processor;
   a display coupled to the processor;
   a transceiver coupled to the processor;
   a user interface coupled to the processor; and
   memory coupled to the processor and containing program instructions that, when executed, cause the processor to
   receive data related to operation of the wireless mobile device at the transceiver over a first wireless connection with a wireless headgear apparatus, the wireless headgear apparatus in communication with the wireless mobile device over a second wireless connection;
   display information related to the operation of the wireless mobile device on the display based on the received data;
   receive a user selection related to the operation of the wireless mobile device via the user interface; and
   transmit the user selection to the wireless headgear apparatus over the first wireless connection using the transceiver.

2. The system of claim 1, wherein the vehicle is a two-wheeled vehicle.

3. The system of claim 1, wherein wireless headgear apparatus includes a helmet.

4. The system of claim 1, wherein the wireless mobile device includes a wireless phone and the received data includes call information for the wireless phone.

5. The system of claim 1, wherein the user interface includes a graphical user interface and a touchscreen integrated with the display.

6. The system of claim 1, wherein the user selection is one of an instruction to answer a call received by the wireless mobile device and an instruction to end a call received by the wireless mobile device.

7. The system of claim 1, wherein the first wireless connection uses infrared data transmission and the second wireless connection uses Bluetooth data transmission.

8. A headgear apparatus for enabling use of a wireless mobile device with a vehicle, comprising:
   a headgear structure;
   a speaker and a microphone coupled to the headgear structure; and
   a communication module coupled to the headgear structure, the communication module including a first transceiver and a second transceiver;
   wherein the communication module is configured to
   establish a first wireless connection with the wireless mobile device using the first transceiver;
   establish a second wireless connection with the vehicle using the second transceiver;
   transmit data related to operation of the wireless mobile device to the vehicle for display using the second wireless connection; and
   receive a user selection related to the operation of the wireless mobile device from the vehicle using the second wireless connection.

9. The apparatus of claim 8, wherein the vehicle is a motorcycle and the headgear structure is a helmet.

10. The apparatus of claim 8, wherein the wireless mobile device includes a wireless phone and the data related to the wireless mobile device includes call information for the wireless phone.

11. The apparatus of claim 8, wherein the user selection is one of an instruction to answer a call received by the wireless mobile device and an instruction to end a call received by the wireless mobile device.

12. The apparatus of claim 8, wherein the communication module includes first and second wireless transceivers.

13. The apparatus of claim 12, wherein the first wireless transceiver is configured to use Bluetooth data transmission, and the second wireless transceiver is configured to use infrared data transmission.

14. A system for enabling use of a wireless mobile device with a vehicle, comprising:
   a headgear apparatus including a speaker, a microphone, and a communication module each coupled to a headgear structure, the communication module configured to establish a wireless connection with a wireless mobile device to receive first voice or audio content for reproduction by the speaker from the wireless mobile device and to transmit second voice or audio content received from the microphone to the wireless mobile device; and a vehicle display apparatus including a processor and further including a display, a user interface, a transceiver, and memory each coupled to the processor, wherein the memory includes program instructions that, when executed, cause the processor to receive data related to operation of the wireless mobile device from the headgear apparatus;

display user interface information related to the operation of the wireless mobile device on the display based on the received data;

receive a user selection related to the operation of the wireless mobile device and corresponding to the displayed user interface information via the user interface; and transmit a control signal based on the user selection, the control signal configured to cause the wireless mobile device to execute an instruction corresponding to the user selection.

15. The system of claim 14, wherein the vehicle is a motorcycle and the headgear structure is a helmet.

16. The system of claim 14, wherein the wireless mobile device includes a wireless phone and the data related to the wireless mobile device includes call information for the wireless phone.

17. The system of claim 14, wherein the user selection is one of an instruction to answer a call received by the wireless mobile device and an instruction to end a call received by the wireless mobile device.

18. The system of claim 14, wherein the user interface includes a graphical user interface and a touchscreen integrated with the display.

* * * * *